Dec. 12, 1950 E. A. COX 2,533,223
CLARIFIER OF SEWAGE BY COLLOIDAL DEGENERATION
Filed May 24, 1946 2 Sheets-Sheet 1
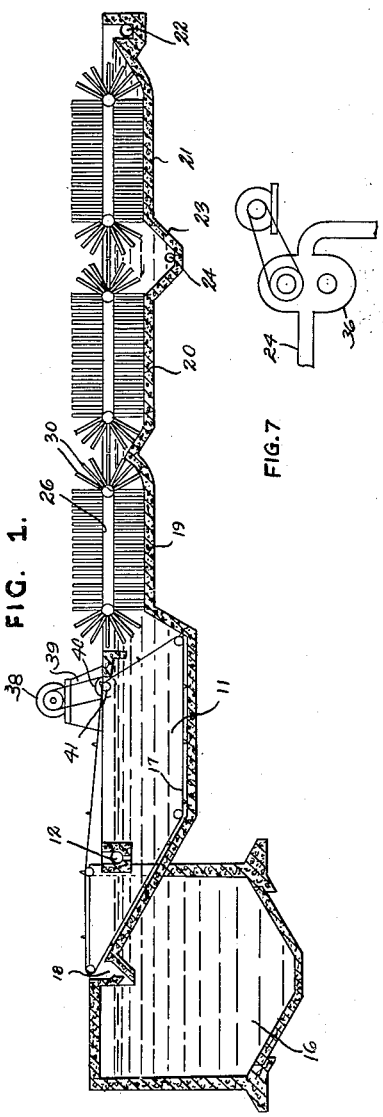
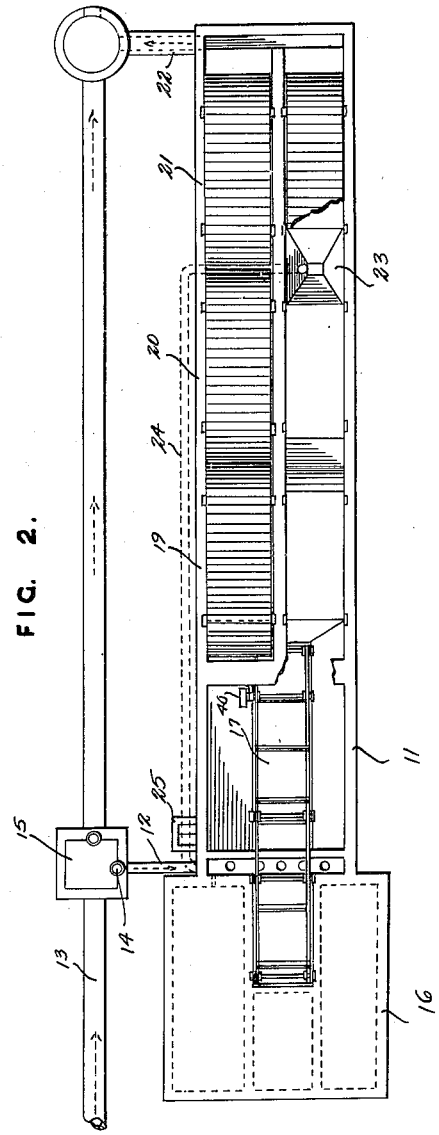
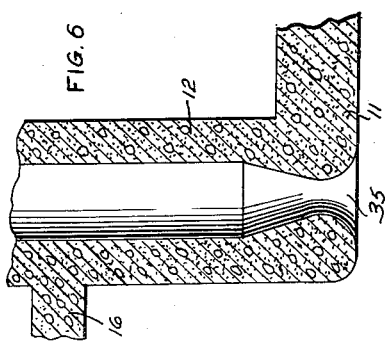
Inventor
ELZA A. COX, Dec. 12, 1950   E. A. COX   2,533,223
CLARIFIER OF SEWAGE BY COLLOIDAL DEGENERATION
Filed May 24, 1946   2 Sheets-Sheet 2
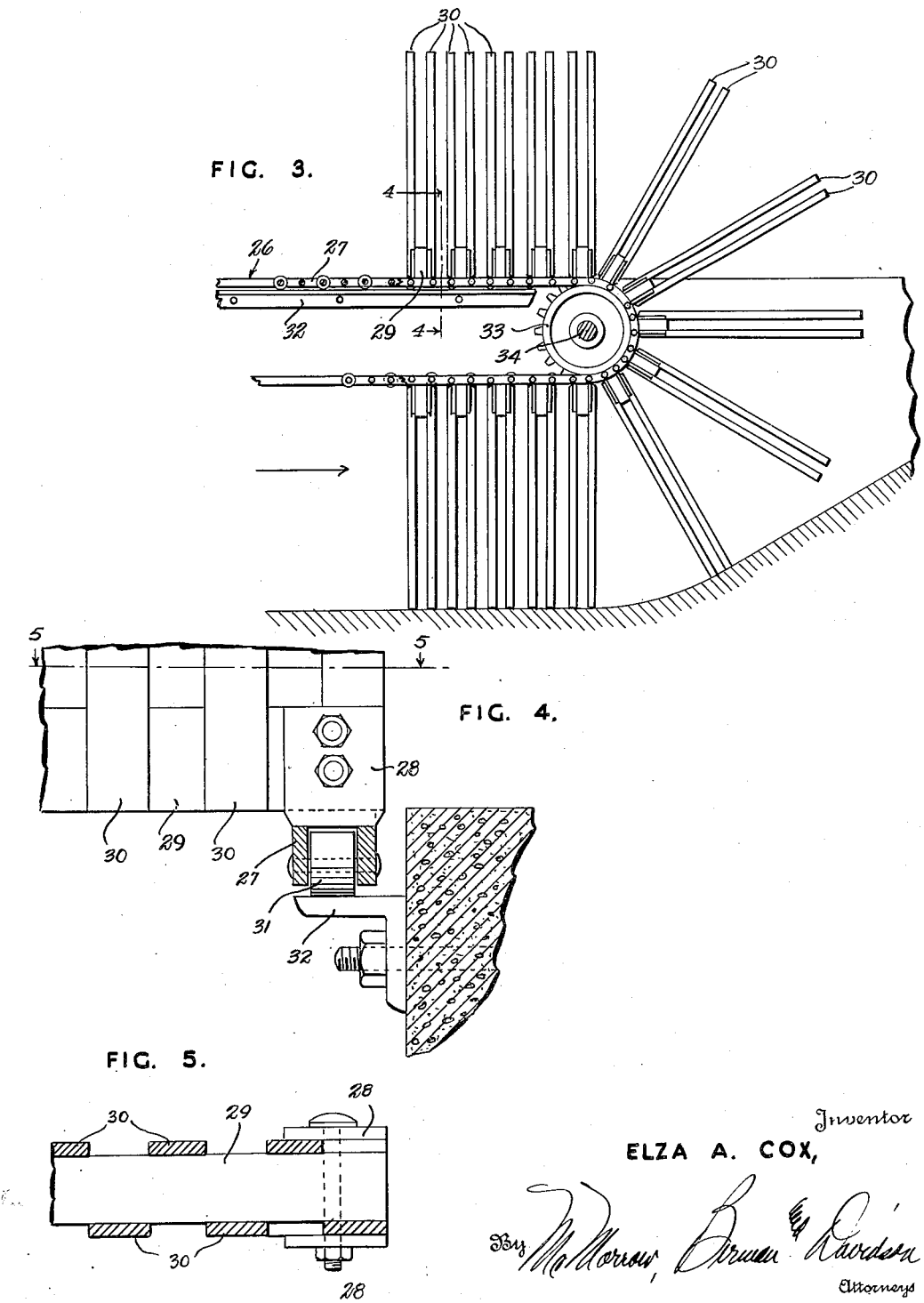
Inventor
ELZA A. COX, Patented Dec. 12, 1950

2,533,223

UNITED STATES PATENT OFFICE 2,533,223

CLARIFIER OF SEWAGE BY COLLOIDAL DEGENERATION

Elza A. Cox, Marion, Ill.

Application May 24, 1946, Serial No. 672,113

2 Claims. (Cl. 210—8)

This invention relates to sewage treatment systems, and more particularly to a sewage treatment system wherein the liquids are clarified and purified by the removal of matter in colloidal suspension therein.

A main object of the invention is to provide a novel and improved method and means for treating sewage liquids wherein the liquids are clarified and purified by the removal of matter in colloidal suspension therein, the removal and reduction of the colloids being facilitated by making available a large supply of oxygen thereto in a simple and efficient manner.

A further object of the invention is to provide an improved sewage treatment apparatus of simple construction and which is highly effective to remove and reduce the colloidal matter from the sewage fluid, said apparatus being relatively inexpensive to build and requiring a minimum of attention from operating personnel.

Further objects and advantages of the invention will become apparent from the following description and claims, and from the accompanying drawings, wherein:

Figure 1 is a vertical longitudinal cross-sectional view taken through a sewage treatment apparatus constructed in accordance with the present invention.

Figure 2 is a plan view of the apparatus of Figure 1.

Figure 3 is an enlarged detail view in side elevation of a portion of a rotary comb member employed in the apparatus illustrated in Figure 1.

Figure 4 is a detail cross-sectional view taken on line 4—4 of Figure 3.

Figure 5 is a detail cross-sectional view taken on line 5—5 of Figure 4.

Figure 6 is an enlarged sectional detail of a Venturi inlet port of a portion of Figure 1.

Figure 7 is an enlarged fragmentary elevation forming an alternative modification of structure shown in Figure 2.

In the system of the present invention an arrangement of rotary belt-carried comb members having teeth of wood or other suitable material is provided, the arrangement being such that the teeth are adapted to be moved successively from positions where they are immersed in the liquid to be clarified to positions where they are exposed to the atmosphere for comparatively short periods of time, the arrangement of the teeth being such that the liquid does not have an unimpeded passage through them and said teeth present a maximum surface area to the liquid to be clarified.

Referring to the drawings, wherein a preferred form of the invention is illustrated, the system comprises a sedimentation basin 11 which receives the sewage from a sewer pipe 12, said pipe being adapted to be connected to a sewer main 13 by a control valve 14 located in a manhole 15. Positioned rearwardly of basin 11 is a sewage digestion tank 16 adapted to receive settled sewage material from basin 11 by means of a belt conveyor 17 provided in basin 11 which is adapted to carry the settled material rearwardly from the bottom portion of basin 11 to a chute 18 leading into digestion tank 16.

The forward overflow portion of sedimentation tank 11 is connected to a pair of lanes of clarifier sections 19, 20 and 21, the last section 21 of each lane having its forward overflow portion leading to an effluent conduit 22 from which the clarified fluid is conducted from the clarifier system to the main leading to its ultimate destination. Between clarifier section 20 and clarifier section 21 a sludge trough 23 is provided connected to a conduit 24 extending to intake main 12 through a weir box 25 for feeding the activated sludge back to sedimentation tank 11. A conventional pump 36 driven by a motor 37 (Figure 7) may be provided in conduit 24, or a venturi 35 may be employed at the outlet of main 12, as shown in enlarged section in Figure 6, for developing the required head for feeding back the sludge. Special advantages relating to the use of a venturi will be later referred to.

It may be mentioned that a motor or other prime mover 38 driving a chain 39 connected to a sprocket for rotating roller 41 of conveyor belt 17 will serve to operate this conveyor, although other means may be used if so desired.

Mounted in each clarifier section is an endless belt device 26, each belt device comprising parallel endless chain sections 27 carrying rigidly secured thereto a series of spaced pairs of outwardly projecting plate members 28. Extending transversely of the parallel chain sections 27 and secured between opposing pairs of plate members 28 are supporting bars 29 and secured to said supporting bars 29 in alternating or staggered relationship on each side thereof are outwardly projecting teeth members 30 of wood or other suitable material. At spaced intervals thereon the chain sections 27 are provided with rollers 31 which engage longitudinal supporting rails 32 provided in the side walls of the clarifier sections for maintaining the upper portions of the chain sections in substantially horizontal position. The chain sections are supported on sprocket wheels 33 which are mounted on transverse shafts 34 journaled in the side walls of the clarifier sections and driven by a suitable motor. The rotation of the shafts 34 is at a relatively slow speed and is such that the lower teeth of the comb units in clarifier sections 19 and 20 move in the direction of flow of the sewage fluid and the lower teeth of the comb unit in the effluent clarifier section 21 move in a direction opposed to the flow of the fluid. This provides a sweeping action, as will be subsequently described, which moves the activated sludge toward the sludge trough 24.

Where a plurality of sections are employed, as shown in the preferred embodiment illustrated in the drawings, the movement of the immerse teeth of the last unit opposes the flow of liquid while the movement of the immersed teeth of the other units is in the same direction as the liquid flow. This arrangement facilitates the handling of any sludge or other material which may be shed from the teeth and also tends to decrease the loss of head through and within the system. Thus, there is little or no necessity for a difference in elevation between the inlet and outlet of the liquid which is moved through the system. This is an advantage in low lying flat terrain where it is virtually impossible to secure much difference in elevation between the inlet and outlet of any system without undue expense.

The movement of the teeth must be very slow through the liquid to avoid excessive turbulence and since, for efficiency, the periods of immersion and exposure to the atmosphere should be of short duration, it is advantageous, as illustrated in the preferred embodiment shown in the drawings, to divide the total number of teeth into convenient units operating in tandem in separate lanes. For larger installations more than two lanes may be effectively employed.

The clarifying and purifying action of the system is as follows:

The sewage or other liquid discharges from a main 12 into sedimentation basin 11. With the heavier matter settled out in basin 11 the liquid comes into intimate contact with the surface of the immersed teeth 30. Immediately some of the material in colloidal suspension begins to attach itself to the surfaces of the teeth in the form of slime, often called "bacterial jelly," since as the slime ages it takes a gelatinous form. When the teeth surfaces are moved into exposure to the atmosphere this slime and the film of liquid thereon absorb a very high amount of oxygen. When, as the cycle of movement of the teeth progresses, the surfaces of the teeth are again immersed in the liquid, more bacterial jelly, which contains a large amount of aerobic bacteria, is further deposited thereon. As the cycles of movement are repeated and continued the process is successively accelerated and the increase in the bacterial content of the slime becomes enormous. The bacterial action of these aerobic bacteria appears to produce enzymes which evidently assist greatly in the coagulation, reduction and attachment to the teeth of the matter in colloidal suspension in the liquid being clarified. Within a comparatively short time, depending upon the temperature, strength and the viscosity of the liquid, and other factors depending upon the kind and nature of the liquid being treated, the system will stabilize itself. Each tooth will be closely surrounded by heavy layers of bacterial jelly from which filaments or "strings" of like material will fan out or radiate, and wavering plumes or masses of semi-consolidated colloids will fill a great portion of the space between the teeth. As the teeth and their integument move very slowly through the liquids, the colloids, semi-colloids, and other light settleable solids are literally swept from the liquid while at the same time any putrescible matter in true solution as well as any coagulated colloids are being attached to or chemically exposed to the teeth and are reduced to inert matter and relatively odorless gases by the action of the areobic bacteria in the slime.

After a period of time the greater part of the bacterial jelly on each tooth (but not at the same time for each tooth) unloads or sheds from the tooth and falls to the floor of the section and slides down or is swept to the sludge sump 23 from whence it is returned to sedimentation basin 11 through conduit 24. In basin 11 the sludge is settled out with other heavy solids and is conveyed to digestion tank 16 by conveyer 17.

The unloading of the slime from the teeth is evidently due to oxidation within the mass of the slime, by the constantly changing direction of movement of the teeth, and also by the constant wash of the liquid, combined with the ever increasing weight of the slime itself. Not all the teeth will unload at the same time. After an initial period of normal operation the rate of unloading will become substantially uniform and stabilized, the different individual teeth being in all stages of loading and unloading at any given time.

An important feature of the system herein disclosed is the "sweeping out" or filtering action provided by the teeth as the liquid flows through the clarifier sections. This is especially important at the effluent end of the system where the teeth move downwardly and rearwardly against the flow of liquid, sweeping out all floating debris and sludge. This makes a secondary settling tank unnecessary.

Another important feature of the system is the addition of dissolved oxygen to the liquid throughout the whole process and especially at the effluent end of the system. This action occurs because the aerobic bacteria in the bacterial jelly has a great affinity and need for oxygen in their life cycle, absorbing great quantities of it which is partly given up to the liquid when the teeth are immersed therein.

The clarifying process employed in the present invention may be considered as including four main features, as follows:

1. The continuous removal of primary sludge from sedimentation basin 11 and its deposit in sludge digestion tank 16, and as a consequence the continuous return of the excess liquid of the digestion tank, displaced by the sludge, to the sedimentation basin.

2. The beneficial effect on sedimentation of the returned sludge and partially clarified sewage to incoming raw sewage in main 12.

3. The means for the return and the weir means for the regulation of the volume of the returned sludge and partially clarified sewage to the sedimentation basin 11.

4. The colloidal degeneration action of the clarifier system of moving teeth members for coagulating the matter in colloidal suspension, the oxidation of matter in true solution, the filtration of sludge from the effluent liquid, and the deposit of partially oxidized coagulated material in the sump trough 23 for return to sedimentation basin 11.

The teeth are flat, thin and straight, so that when they pass through the affluent, they pick up a slimy layer by surface attraction and adhesion and the glueiness of the materials in the sewage, so that a certain amount of substance accumulates thereon. As they leave the affluent and pass to the air above, the teeth are inverted and allow a portion of the materials to flow slowly down and thicken near the plate, at the same time evaporation passes off some of the water. This flow turns the slime and presents more surface to be aerated and oxygenized and thereby clarifies the affluent in the sections more. When it passes through the affluent again, it accumulates more material on the teeth while at the same time introduces more bacteria into the affluent. The slime thickened and hardened by the aerating increases the capacity of the teeth to collect more material and the efficiency of the sections, until a maximum is reached. If the material becomes too thick and heavy it is knocked off the teeth and becomes sludge at the bottom of the sections, to be propelled into the settling basin and removed.

While specific embodiments of a method and means of sewage treatment have been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. A sewage clarifying system comprising in combination, a sedimentation basin having a flat bottom surface and sides in a longitudinal direction angularly disposed with respect to said surface and including an inlet for the introduction of sewage affluent therein, a conveyor having cleaning units thereon for collecting the sludge deposited on said surface and settling from the affluent and carrying it up one of said sides and ejecting it from said basin, a chute to receive said ejected sludge, a digestion tank connected with said chute for receiving and holding said ejected sludge for treatment therein, an overflow channel on said basin for carrying excess affluent therefrom, a plurality of clarifying sections connected with said channel for receiving the excess affluent continuously, an endless belt operating rotatably and longitudinally in said sections, a plurality of closely spaced plate members attached to said belt and projecting outwardly from said belt and traveling therewith, a plurality of spaced teeth projecting outwardly from said members and extending the full width and depth of the affluent carrying portions of the sections so as to sweep along close to the floor thereof for agitating the affluent slowly and throughout the entire lengths of the sections by substantially half of the teeth at a time, the remaining half of the teeth being above the sections and exposedly traveling through the air simultaneously therewith so that sewage affluent thereon will be oxygenized thereby while planting its colloidal sewage on the teeth moving therethrough and providing a bacterial slime thereon for increasing the oxygenizing action, the teeth in the first and second of said clarifying sections moving in a direction away from said basin and the teeth in the third of said clarifying sections moving in a direction toward said basin to propel any further sludge developed in said sections for its removal therefrom and the further clarification of the sections, said teeth being of wood material having an active attraction for facilitating the adherence of the affluent thereon and the growth of aerobatic bacteria without interfering with the removal of coagulated materials thereon as the teeth repass through the affluent, a sludge trough disposed intermediate the second and third of said clarifying sections for receiving the further sludge developed in said clarifying sections, means for removing the processed affluent after it passes through said sections, and means for actuating said conveyor and endless belt.

2. A sewage clarifying system comprising in combination, a sedimentation basin having a flat bottom surface and sides in a longitudinal direction angularly disposed with respect to said surface and including an inlet for the introduction of sewage affluent therein, a conveyor having cleaning units thereon for collecting the sludge deposited on said surface and settling from the affluent and carrying it up one of said sides and ejecting it from said basin, a chute to receive said ejected sludge mounted on said basin and at a predetermined location thereof, a digestion tank connected with said chute for receiving and holding said ejected sludge for treatment therein, an overflow channel on said basin and spaced away from said chute for carrying excess affluent therefrom, a plurality of clarifying sections connected in tandem with said channel for receiving the excess affluent continuously, an endless belt operating rotatably and longitudinally in said sections, a plurality of closely spaced plate members attached to said belt and projecting outwardly from said belt and traveling therewith, a plurality of spaced teeth relatively flat, thin and straight projecting outwardly from said members and extending the full width and depth of the affluent carrying portions of the sections so as to sweep along close to the floor thereof for agitating the affluent slowly and throughout the entire lengths of the sections by substantially half of the teeth at a time, the remaining half of the teeth being above the sections and exposedly traveling through the air simultaneously therewith so that sewage affluent thereon will be oxygenized thereby and its residue thickened on the portions of the teeth adjacent to the plate members while planting its colloidal sewage on the teeth moving therethrough and providing a bacterial slime thereon for increasing the oxygenizing action, the teeth in the first and second of said clarifying sections moving in a direction away from said basin and the teeth in the third of said clarifying sections moving in a direction toward said basin to propel any further sludge developed in said sections for its removal therefrom and the further clarification of the sections, said teeth being of wood material having an active attraction for facilitating the adherence of the affluent thereon and the growth of aerobatic bacteria without interfering with the removal of coagulated materials thereon as the teeth repass through the affluent, a sludge trough disposed intermediate the second and third of said clarifying sections for receiving the further sludge developed in said clarifying sections, means for removing the processed affluent after it passes through said sections, and means for actuating said conveyor and endless belt, said sections being spaced apart to allow the respective teeth at the ends thereof to be moved through an arcuate path without touching each other.

ELZA A. COX.

REFERENCES CITED

The following references are of record in the file of this patent:

UNITED STATES PATENTS

| Number | Name | Date |
|---|---|---|
| 1,806,287 | Forrest | May 19, 1931 |
| 1,811,181 | Maltby | June 23, 1931 |
| 2,098,152 | Kessener | Nov. 2, 1937 |
| 2,211,565 | Hawley | Aug. 13, 1940 |
| 2,258,398 | Ward | Oct. 7, 1941 |
| 2,348,126 | Green | May 2, 1944 |
| 2,359,004 | Schlenz et al. | Sept. 26, 1944 |
| 2,419,492 | Green | Apr. 22, 1947 |